Figure 1:
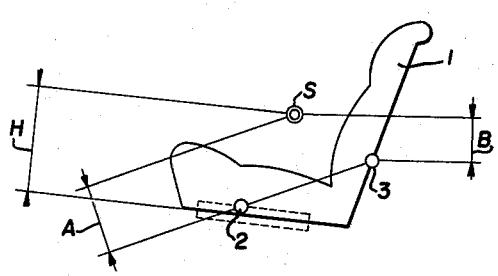

Feb. 23, 1965     B. BARÉNYI     3,170,728
SEAT FOR MOTOR VEHICLES
Filed Jan. 18, 1960     3 Sheets-Sheet 1

INVENTOR.
BÉLA BARÉNYI
BY
ATTORNEYS

Feb. 23, 1965   B. BARÉNYI   3,170,728
SEAT FOR MOTOR VEHICLES
Filed Jan. 18, 1960   3 Sheets-Sheet 2

INVENTOR.
BELA BARÉNYI
BY Dickey, Craig & Freudenberg
ATTORNEYS

Feb. 23, 1965  B. BARÉNYI  3,170,728
SEAT FOR MOTOR VEHICLES
Filed Jan. 18, 1960  3 Sheets-Sheet 3

INVENTOR.
BÉLA BARÉNYI
BY
Dicke, Craig & Freudenberg
ATTORNEYS

United States Patent Office 3,170,728
Patented Feb. 23, 1965

3,170,728
SEAT FOR MOTOR VEHICLES
Béla Barényi, Stuttgart-Vaihingen, Germany, assignor to Daimler-Benz Aktiengesellschaft, Stuttgart-Unterturkheim, Germany
Filed Jan. 18, 1960, Ser. No. 2,983
Claims priority, application Germany, Jan. 24, 1959, D 29,846
8 Claims. (Cl. 297—344)

The present invention relates to a seat or seating bench for motor vehicles provided with a seat frame carrying the cushions which seat frame is suspended from or supported by two shafts formed, for example, by two axle journals effectively constituting a forward and rearward pivot axis, and which is adapted to be displaced in the vehicle longitudinal or driving direction by any suitable adjusting mechanism.

The construction and arrangement of a modern motor vehicle seat either in the form of an individual seat or a seating bench has to satisfy the following requirements:

(a) The frame of the seat and the support thereof have to be as rigid and sturdy as possible;

(b) During displacement of the seat in the driving direction, the seating angle should not change;

(c) Sufficient free space should remain under the front seats for the legs and feet of the passengers on the rear seats;

(d) The seats are to be supported at least within the region of the back rest directly on the longitudinal bearer members of the frame;

(e) The support of the seats is to be such as to enable the ready removal thereof for use of the seats outside the vehicle, for example, during camping, without impairing the stability thereof; and (f) The seat is to be such as to enable the accommodation and installation of a safety belt.

All of the afore-mentioned requirements are satisfied according to the present invention in an extremely simple and advantageous manner by the fact that at least the portion of the seat frame disposed between the two mountings or supports of the two shaft journals is constructed rigid in itself and that at least the support or mounting of the rear supporting axle or shaft is arranged as high as possible. The seat frame may thereby be constructed advantageously in one piece, at least between the mountings of the two support shafts, for example of a shell made of synthetic material which may be provided possibly with projections, indentations or the like for the support of the supporting shafts or journals.

Particularly favorable seating conditions result, according to the present invention, from the fact that the seat frame and the suspension thereof are so constructed that the center of gravity of the seated person is disposed at least approximately in the center between the two supporting shafts or pivot axes and as close as possible to the plane passing through the two supporting shafts or pivot axes. The rear support axis or shaft may thereby be disposed appropriately at least approximately at the height of the center of gravity of the seated person or also thereabove.

The space below the seating frame offers sufficient space for the accommodation and installation of the adjusting and/or displacing mechanism of the seat and, more particularly, this adjusting mechanism may be located appropriately between the forward end of the seating frame and a point of the frame at least below the center thereof.

In one preferred embodiment according to the present invention, the support of the seat is advantageously so constructed that the supporting shafts or journals of the seating frame are supported on the superstructure of the vehicle, such as the frame, chassis or body of a self-supporting type motor vehicle body construction, by means of swinging members which are arranged in a pair-like manner at least at the rear supporting axis. The swinging members of one pair may thereby possibly also be connected with each other by a cross-member. A single swinging member may also be provided at the forward bearing support of the seat in the place of the pair of swinging members which may be formed by a single transversely disposed sheet metal strip or may be shaped in a V-like manner with the leg portions thereof extending downwardly.

A favorable freedom for the feet of the passengers seated on the rear seat may be obtained, in accordance with the present invention, in an advantageous manner by dimensioning the transverse distance of the swinging member for the rear supporting shaft or journal at least at the lower end thereof approximately corresponding to the width of the seating frame. A particularly reliable support of the seat can be obtained, according to the present invention, by arranging the lower joints especially of the rear swinging member at the longitudinal bearer member of the vehicle superstructure, such as the frame thereof.

A good stability and sturdiness of the seat results, in accordance with the present invention, from the fact that the forward and rearward swinging member are at least equally long and that the lower joints of the rear swinging member are disposed above the lower joints of the forward swinging member. These joints may thereby be advantageously so arranged that the lower joints of the swinging members are disposed at the corners of as large as possible a rectangle and that of the upper joints, the projections on this rectangular surface of at least the forward joints are disposed within this surface. The arrangement may thereby appropriately be so made that also after displacement or adjustment of the seat, at least the projections of the forward joints of the swinging members are disposed within the rectangle formed by the lower joints of the swinging members. The position of the joints of the upper swinging members may thereby be changed in a simple manner by rendering the supporting shafts or journals of the seating frame adjustable by means of eccentric discs.

In order to enable the seat frame of the seat to be readily detached and removed from the support thereof within the vehicle, and to permit ready use thereof outside the vehicle in combination with an appropriate supporting frame for purposes of providing a movable seat, the swinging members, according to the present invention, may be connected with the seat frame by bolt members which are movable in the direction of the joint axes and, more particularly, the joint bolt members are either threaded or adapted to be displaced against the effect of springs.

With a seat having an adjustable back rest, the joint of the adjusting mechanism of the back rest may coincide with the upper joint of the swinging member so as to be coaxial therewith. If, additionally, the seat is equipped with a safety belt, then the latter can be appropriately arranged at the rear supporting shaft or journal of the seat frame.

Accordingly, it is an object of the present invention to provide a seat for motor vehicles which obviates the disadvantages of the prior art devices by simple and reliable means.

It is another object of the present invention to provide a seat for motor vehicles which is simple in construction, easy to adjust, satisfies the requirements of modern seat construction for passenger motor vehicles, and assures driving comfort to the person seated thereon regardless of the position to which the seat is adjusted.

Still another object of the present invention resides in the provision of a motor vehicle seat which is constructed in such a manner as to provide substantial sturdiness and stability of the seat and permits ready adjustment thereof.

Still another object of the present invention resides in the provision of a seat for a motor vehicle which may be readily removed so as to enable its use outside the vehicle without impairing its stability and safety while installed in the vehicle.

A still further object of the present invention resides in the provision of a motor vehicle seat which satisfies the requirements concerning favorable spatial conditions within the vehicle for the passengers on the rear seat, especially insofar as foot space is concerned.

Figure 3:
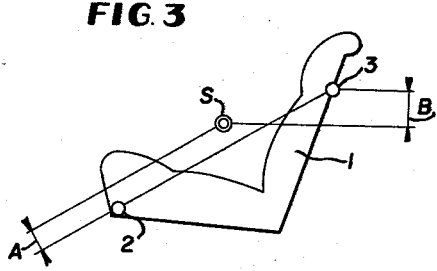
Figure 4:
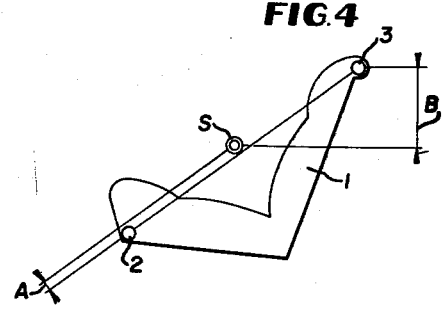
Figure 5:
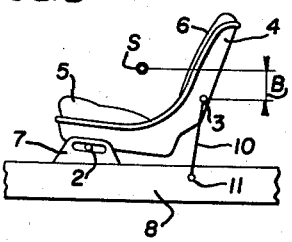
Figure 6:
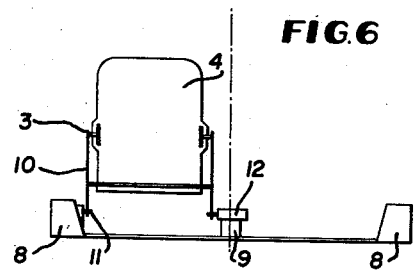
Figure 7:
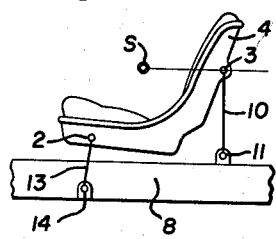
Figure 8:
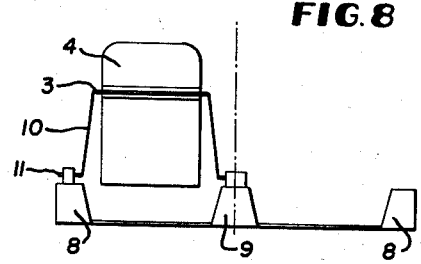
Figure 9:
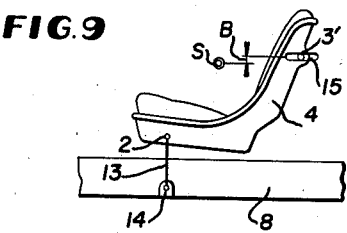
Figure 10:
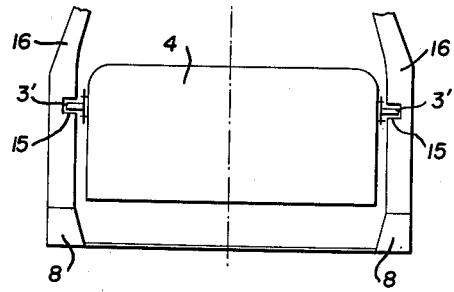
Figure 11:
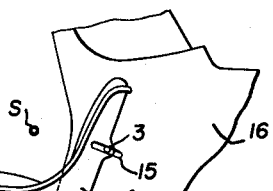
Figure 12A:
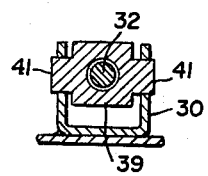
Figure 12:
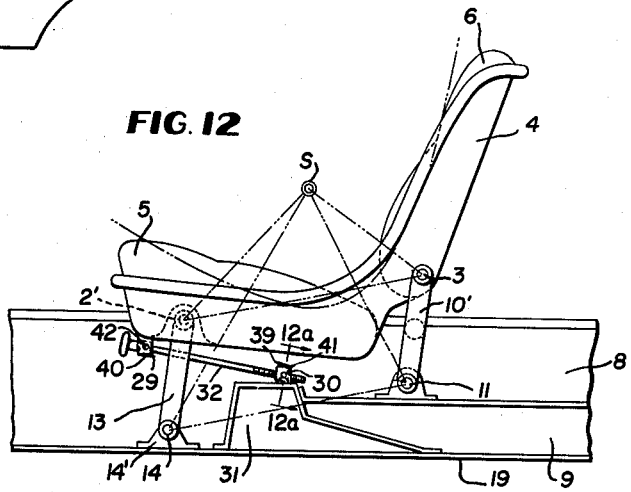
Figure 13:
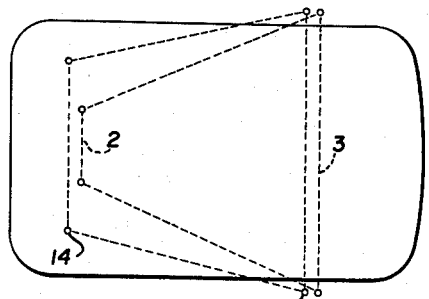
Figure 14:
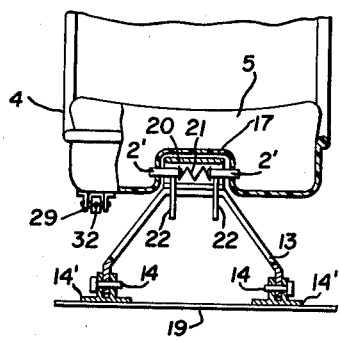
Figure 15:
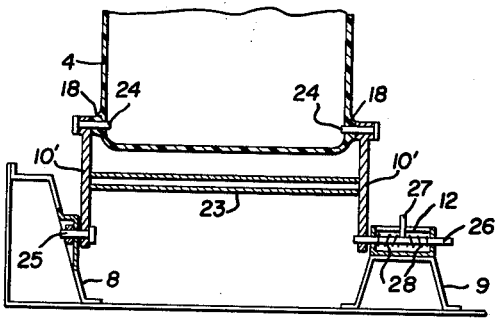
Figure 16A:
Figure 16B:
Figure 16C:
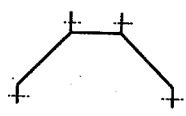
Figure 16D:
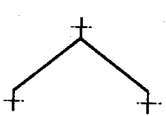
Figure 16E:
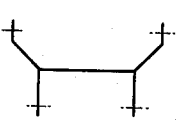
Figure 17:
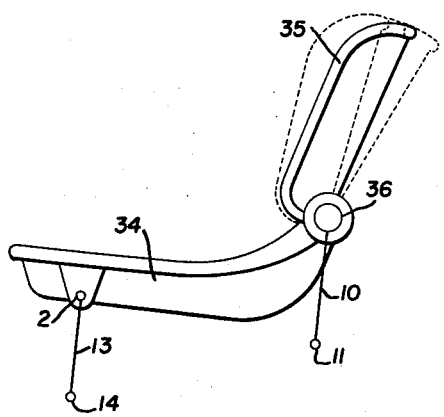
Figure 18:
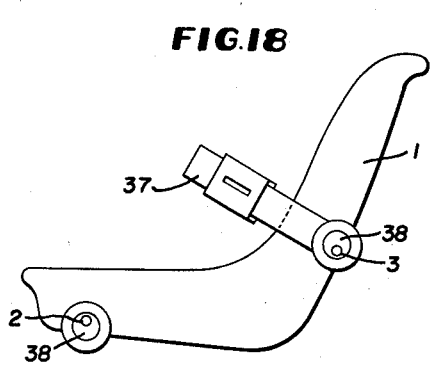

These and other objects, features and advantages of the present invention will become more obvious upon the following description, when taken in connection with the accompanying drawing which shows, for purposes of illustration only, several embodiments in accordance with the present invention and wherein FIGURES 1 through 4 are schematic side views of four embodiments of a seat construction in accordance with the present invention and illustrating four different variations for the support thereof, FIGURE 5 is a somewhat schematic side elevational view of a seat according to the present invention, provided with a seat frame consisting of a synthetic material shell member which is supported in front thereof by suitable guide means and in the rear thereof by a pair of swinging members, FIGURE 6 is a rear elevational view of a seat of FIGURE 5, FIGURE 7 is a somewhat schematic side elevational view of a modified embodiment of a seat in accordance with the present invention, similar to FIGURE 5, in which the seat is supported in front as well as in the rear thereof by swinging members, FIGURE 8 is a rear elevational view of the seat illustrated in FIGURE 7, FIGURE 9 is a somewhat schematic side elevational view of a still further embodiment of a seating bench in accordance with the present invention, provided with a pair of swinging members for the support of the seat in front thereof and suitable guide means in the rear thereof, FIGURE 10 is a rear elevational view of the seat bench of FIGURE 9, FIGURE 11 is a somewhat schematic side elevational view of a still further modified embodiment of a seat in accordance with the present invention, provided with suitable guide means at the front and rear support thereof, FIGURE 12 is a side elevational view of a seat construction in accordance with the present invention, similar to FIGURE 7 and on a larger scale, to illustrate the details thereof, FIGURE 12a is a sectional view taken through line 12a—12a of FIGURE 12, FIGURE 13 is a plan view of the seat of FIGURE 12, indicating the support base thereof, FIGURE 14 is a cross-sectional view through the front supporting means of the seat of FIGURE 12, FIGURE 15 is a cross-sectional view through the rear supporting means of the seat in FIGURE 12, FIGURES 16a through 16e illustrate schematically five embodiments of swinging levers for use with the present application, FIGURE 17 is a schematic side elevational view of a still further modified embodiment of a seat in accordance with the present invention, provided with an adjustable back rest, and FIGURE 18 is a side elevational view of a seat provided with adjustable supporting shafts or journals and a safety belt, in accordance with the present invention.

Figure 2:
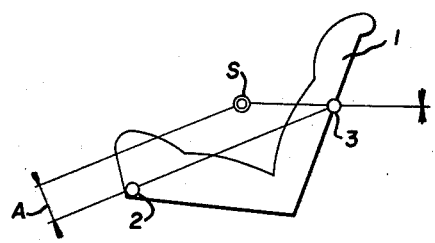

Referring now to the drawing, wherein like reference numerals are used throughout the various views to designate corresponding parts, and more particularly to FIGURES 1 to 4, reference numeral 1 designates, in each of these figures, a seat in accordance with the present invention which is suspended by means of two supporting journals or shafts 2 and 3, constituting two transverse pivot axes, in such a manner as to be adjustable in the longitudinal direction of the seat. These four figures illustrate the conditions of the position of the center of gravity S of the person seated on the seat 1 with respect to the pivot axes or supporting shafts 2 and 3. Whereas the distance H of the center of gravity S from the base surface of the seat is essentially constant in all of the four embodiments of FIGURES 1 through 4, the distance A of the center of gravity S from the plane passing through the two pivot axes or supporting shafts 2 and 3 decreases from the first to the fourth embodiment of FIGURES 1 through 4. This is achieved, in accordance with the present invention, by locating the rear pivot axis or support shaft 3 at a distance B with respect to a horizontal passing through the center of gravity S in FIGURE 1. In the embodiment of FIGURE 2, this distance B becomes zero by arranging the rear pivot axis or supporting shaft 3 essentially at the height of the center of gravity S. In the embodiments of FIGURES 3 and 4, the rear supporting shaft or pivot axis 3 is disposed above a horizontal passing through the center of gravity S. The greater the distance B in FIGURES 3 and 4, the more the center of gravity S approaches the plane passing through the two supporting shafts or pivot axes 2 and 3, whereby—in the embodiment of FIGURE 4, in which the rear supporting shaft or pivot axis 3 is arranged at the upper end of the back rest of the seat 1—the center of gravity S almost coincides with the plane passing through the supporting shafts or pivot axes 2 and 3.

FIGURES 5 to 11 illustrate different embodiments for the support of the seat in accordance with the present invention. The seat according to the present invention, in all of these embodiments of FIGURES 5 through 11, consists of a unitary shell member 4 made of synthetic material, such as any suitable plastic material, which may be injection-molded or made in any other suitable manner possibly with appropriate reinforcements, and which serves as seat frame and accommodates thereon a seating cushion 5 and a back rest cushion 6. In the embodiment according to FIGURES 5 and 6, the forward supporting means 2 of the seating shell member 4 is adapted to be slidably guided in two slotted guide means 7 which are arranged at an outer longitudinal bearer member 8 and at a central longitudinal bearer member 9 of the vehicle superstructure, such as the frame of a passenger motor vehicle. The rear supporting means 3 is pivotally connected by means of a pair of swinging members 10 with both longitudinal bearer members 8 and 9. The lower joints 11 of the swinging members 10 are arranged, on the one hand, directly at the inner wall of the outer longitudinal bearer member 8, and, on the other hand, at a projection 12 of the central longitudinal bearer member 9.

In the embodiment of the seating arrangement illustrated in FIGURES 7 and 8, the two support means 2 and 3 are adjustably positioned by means of swinging members 13 and 10, respectively, which form together with the seating shell member 4 and the longitudinal bearer members 8 and 9 a jointed rectangle. Whereas, in the embodiment according to FIGURES 5 and 6, the upper support means 3 is arranged below the horizontal passing through the center of gravity S, the horizontal passing through the center of gravity S in FIGURES 7 and 8 is arranged at the height of the center of gravity S. In order that the two swinging members 10 and 13 do not differ too much in length thereof from one another, the lower joint 11 of the rear swinging member 10 is disposed above the corresponding joint 14 of the forward swinging member 13.

The embodiment illustrated in FIGURES 9 and 10 distinguishes itself from the embodiments described hereinabove by the fact that the upper support means which consists, in this embodiment, of two axle journals 3′, is displaceably guided in a slotted guide means 15 of the vehicle superstructure such as the body or frame 16. Furthermore, the upper support journal or pivot axis 3′ is disposed above the center of gravity S and the seating shell member 4 forms the seating frame of a seat bench, though this embodiment may also be used with individual seats, while the other embodiments described herein may also be used with seat benches.

In the embodiment according to FIGURE 11, both supporting means 2 and 3 of the seating shell member 4 are displaceably guided within slotted guide means 7 and 15 of the vehicle or superstructure.

FIGURES 12 to 15 illustrate, in detail, an embodiment of a seat arrangement according to the teachings of FIGURES 7 and 8. The seat itself consists of a seating shell member 4 provided with the two cushions 5 and 6 of any suitable construction, for instance, including any suitable springs and/or foam rubber inserts, whereby the seating shell member 4 which preferably consists of a synthetic material, such as a thermo-hardening plastic material or any other suitable resinous material providing the desired characteristics, forms a body rigid in itself. The seating shell member 4 may be provided with appropriate configurations for purposes of securing or arranging thereat the two support means 2 and 3, for example, with a recessed or indented portion 17 (FIGURE 14) for the forward bearing support means and the bearing lug portions 18 (FIGURE 15) for the rear bearing support means 3. The forward swinging member 13 is constructed in this embodiment of V-shape and is so arranged that its leg portions extend downwardly outwardly (FIGURE 14) and are pivotally secured at 14, for instance, in suitable bearing brackets 14′ provided on the floor 19 of the vehicle. The forward supporting shaft or journal consists of two pivot bolt members 2′ which are slidable within a tubularly-shaped housing 20, whereby a compression spring 21 is clamped between the two bolt members 2′. The two bolt members 2′ are each provided with a handle 22 projecting beyond the housing 20. With the aid of these handles 22, the bolt members 2′ may be displaced toward each other against the spring force of spring 21 and may thereby be pulled out of the bores provided in the seating shell member 4. As a result thereof, the connection between the swinging member 13 and the seating shell member 4 is disengaged and the seating shell member 4 may be removed from the forward swinging member 13. The rear swinging member consists of a pair of swinging members 10′ which are rigidly connected with each other by a transverse web portion 23. The swinging members 10′ of this embodiment are detachably, threadably connected with the seating shell member 4 by means of threaded bolt members 24. The outer lower pivot joint of the swinging member 10′ is formed by a threaded bolt member 25, whereas the threaded bolt member 26 of the inner lower joint for the rear swinging member 10′ is displaceable within the projection 12 with the aid of a handle 27 against the effect of two compression springs 28. As is readily apparent from FIGURES 12 through 15, the jointed connection of the rear swinging member 10′ with both the seating shell member 4 as well as with the longitudinal bearer members 8 and 9 may also be readily disengaged with relatively few manipulations, whereupon the seat 4 may be physically removed out of the motor vehicle for use elsewhere. A suitably constructed displacing and securing mechanism may be arranged between the projection 29 at the forward lower edge of the seating shell member 4 and a projection 30 provided on transverse bearer member 31 of the vehicle superstructure. This adjusting and securing mechanism is of known construction, comprising as it does features of the prior art as exemplified by the patent to Toncray et al., 1,916,346. In accordance with the showing of this reference, the projections 29 and 30 are in the form of two-eared brackets pivotally supporting bushing members 39 and 40 having trunnions 41 and 42 supported in the two-eared brackets as more particularly illustrated in FIGURE 12a. The bushing member 39 on projection 30 is threaded, while the bushing member 40 on projection 29 swingably supports the unthreaded end of rod 32 as shown in FIGURE 12.

The two swinging members 13 and 10′ are of equal effective length, i.e., the length of the shortest distance between the pivot axes 2′ and 14 of arm 13 and the length of arm 10′ between pivot axes 24 and 25 are equal, these arms forming with the lines connecting the pivot axes thereof a parallelogram as seen in side view. The seat support is so constructed that the two swinging members 13 and 10′ in the initial position thereof subtend an angle of approximately 7½ degrees with respect to the vertical. As may be readily seen from FIGURE 13, the illustrated position of the seat forms a relatively large support base. The projections of the upper pivot joints on the support base of FIGURE 13 are thereby disposed closely adjacent the lines connecting the lower pivot joints 14 and 11, and even during adjustments or displacements of the seat, these distances are changed only slightly by the arrangement in accordance with the present invention. The support of the seat with the aid of the swinging members 13 and 10′ additionally entails the advantage that during rearward displacement of the seat not only the forward edge of the seating shell member 4 is moved rearwardly, but simultaneously therewith also the distance thereof from the floor 19 is reduced.

As is quite clearly visible from FIGURES 12, 13, and 15, a sufficiently large free space remains below the rear part of the seating shell member 4 into which the passenger seated on the seat disposed therebehind may comfortably place his feet. The foot-rest-like construction of the transverse bearer member 31 with the inclined rest surface further enhances the comfort of such passenger.

FIGURE 16 illustrates schematically only different possibilities of construction for the swinging members serving for the support of the seat. The embodiment in FIGURE 16a thereby illustrates a pair of swinging members which, in a manner similar to the pair of swinging members 10′ of FIGURE 15, are rigidly connected with each other by a transverse web member 10a. FIGURE 16b illustrates a support which is preferably used for the pivotal connection of the forward supporting journal 2 and which consists of a sheet metal strip 2b or the like. The embodiment in FIGURE 16c corresponds to the swinging member construction illustrated in FIGURE 14 and as described more fully in connection with this figure. A similar construction is illustrated in FIGURE 16d which, however, utilizes a single upper joint in the place of the two joints of FIGURE 16c. FIGURE 16e illustrates a further modification of a pair of swinging members rigidly connected by a transverse web portion in which the distance between the upper joints is larger than the distance between the lower joints thereof.

FIGURE 17 illustrates a modified embodiment in accordance with the present invention in which the seating shell member is constructed in a two-partite manner, and in which the seating shell member consists of a bottom seating shell portion 34 and of a back-rest shell portion 35 which are pivotally connected with each other by an adjusting mechanism 36 of any suitable construction, such as a conventional jointed clamping construction. In the embodiment illustrated in FIGURE 17, the axis of the adjusting mechanism 36 coincides with the rear support axle journal 3 of the seat which, in the embodiment of FIGURE 17, is again pivotally connected by means of a swinging member 10 with the vehicle superstructure, such as the frame thereof.

FIGURE 18 illustrates an arrangement for a safety belt 37 for a seat 1 constructed in accordance with any one of the preceding embodiments of the present invention. Additionally, this embodiment illustrates the possibility to arrange both support axle journals 2 and 3 at eccentric discs 38 by means of which the height and lateral adjustment thereof may be varied. It is, of course, understood that the eccentric discs 38 may also be utilized in accordance with any of the other embodiments of the present invention.

The suspension of the seat in accordance with the present invention, including the two support shafts or axle journals forming effectively two pivot axes, additionally offers in an advantageous manner the possibility to adapt, in case of adjustment or displacement especially of the driver's seat, the position thereof to the size of the driver. The suspension of the support shafts or axle journals may thereby be so constructed that the longitudinal displacement of the seat is combined with a considerable lowering thereof, this being achieved in any known manner. For example, the seat may thereby be lowered in the rear end position thereof by at least 30 mm. with the respect to the position thereof in the center position thereof.

While I have shown and described several embodiments in accordance with the present invention, it is obvious that the same is not limited thereto but is susceptible of many changes and modifications within the spirit and scope of the present invention. For example, the particular arrangement and combination of the joints for the supporting shafts or support means illustrated in FIGURES 1 through 4 may also be used with any combination of the embodiments illustrated in FIGURES 5 through 11. In other words, the location of the rear upper support shaft for the seat, in accordance with the present invention, may be as illustrated in any one of the embodiments of FIGURES 1 through 4 insofar as any one of the embodiments of FIGURES 5 through 11, 17 and 18 are concerned. Additionally, the particular construction of the swinging member used with any of the embodiments according to the present invention may be that of any one of the constructions illustrated in FIGURES 16a through 16e. Furthermore, in those embodiments in which two swinging members are used for the suspension of the seat in accordance with the present invention, the two swinging members may be either identical or any combination of the embodiments illustrated in FIGURES 16a through 16e. Also, the modifications illustrated in FIGURES 17 and 18 may also be used in connection with any of the other embodiments described and shown herein. Thus, it is obvious that the present invention is susceptible of many changes and modifications in accordance with the present invention, and I, therefore, do not wish to be limited to the details shown and described herein but intend to cover all such changes and modifications as are encompassed by the scope of the appended claims.

I claim:

1. In a seat construction for a motor vehicle having a vehicle superstructure, seat frame means including backrest means, seat cushion means supported upon said seat frame means, the improvement consisting essentially of means for supporting said seat frame means on said vehicle superstructure to enable movement of said seat frame means in the longitudinal direction of the vehicle and to provide a high seat stability, said last-mentioned means including forward and rear bearing means secured to said seat frame means and forming forward and rear pivotal support axes extending in the transverse direction of the vehicle, at least the portion of said seat frame means between said two support axes being rigid so as to rigidly connect said two support axes, and a forward and rear swinging member arranged outwardly of and adjacent each side of said seat frame means, each said swinging member being pivotally supported upon said vehicle superstructure at the bottom end thereof and pivotally connected at the upper end thereof to the respective one of said rear bearing means, a further forward and rear swinging member pivoted on said forward support axis said forward support axis being adjacent the bottom part of said seat frame means, a recessed portion in said bottom part having walls intersected by said forward support axis said rear support axis being disposed in the region of said backrest means in a plane vertically spaced above said forward support axis, the lower pivotal supports for each said first-named forward and rear swinging member being arranged in a plane vertically spaced above said lower pivotal supports for said further swinging member, and said swinging members adjacent each said side of said frame means forming with lines connecting their pivot axes as seen in side view a parallelogram ascending rearwardly from the front of said seat frame means, and adjustment means operatively connecting said seat frame means and said vehicle superstructure whereby a high stability of the seat construction is attained.

2. In a seat construction for a motor vehicle having a vehicle superstructure, comprising seat frame means including a rigid shell-like member and backrest means, seat cushion means supported upon said seat frame means, the improvement consisting essentially of means for supporting said seat frame means on said vehicle superstructure to enable movement of said seat construction in the longitudinal direction of the vehicle, said last-mentioned means including forward and rear bearing means secured to said shell-like member and forming forward and rear pivotal support axes extending in the transverse direction of the vehicle, said forward bearing means comprising an indentation in the bottom of said shell-like member approximately in the center thereof and adjacent the front edge and having a pair of oppositely disposed apertures in the sides thereof, a tubular housing, a pair of pivot bolt members slidable within said housing and adapted to slide into said apertures, and a compression spring secured between said bolt members for pressing said bolt members into said apertures, a forward swinging support means for supporting said tubular housing having pivotal connection with said vehicle superstructure, and a rear swinging member arranged adjacent each side of said shell-like member, each said swinging member being pivotally supported upon said vehicle superstructure at the bottom end thereof and pivotally connected at the upper end thereof to the rear bearing means, said rear support axis being disposed in the region of said backrest means in a plane vertically spaced above said forward support axis, the lower pivotal supports for said rear swinging members being arranged in a plane vertically spaced above said pivotal connections for said forward swinging support means, and said rear swinging members and said forward swinging support means forming with lines connecting their pivot axes as seen in side view a parallelogram ascending rearwardly from the front of said seat frame means, and adjustment means operatively connecting said seat frame means and said vehicle superstructure whereby a high stability of the seat construction is attained.

3. A seat construction for a motor vehicle having a vehicle superstructure, comprising seat frame means including backrest means, seat cushion means supported upon said seat frame means, means for supporting said seat frame means on said vehicle superstructure to enable movement of said seat construction in the longitudinal direction of the vehicle, said last-mentioned means including forward and rear bearing means secured to said seat frame means and forming forward and rear pivotal support axes extending in the transverse direction of the vehicle, at least the portion of said seat frame means between said two support axes being rigid so as to rigidly connect said two support axes, and one forward swinging member and at least one rear swinging member arranged adjacent respective opposite ends of said seat frame means, each said swinging member being pivotally supported upon said vehicle superstructure at the bottom end thereof and pivotally connected at the upper end thereof to the respective one of said forward and rear bearing means, said forward swinging member having spaced pivotal supports on said vehicle superstructure, said rear support axis being disposed in the region of said backrest means in a plane vertically spaced above said forward support axis, the lower pivotal support for said rear swinging member being arranged in a plane vertically spaced above said lower pivotal supports for said forward swinging member, and said swinging members forming with lines connecting their pivot axes as seen in side view a parallelogram ascending rearwardly from the front of said seat frame means and adjustment means operatively connecting said seat frame means and said superstructure, whereby a high stability of the seat construction is attained.

4. A seat construction according to claim 3, wherein the rear swinging members are arranged in a pair-like manner.

5. A seat construction according to claim 4, wherein said rear swinging members are interconnected by a web portion.

6. A seat construction according to claim 3, wherein said forward swinging member comprises downwardly, outwardly extending leg portions.

7. In a seat construction for a motor vehicle having a vehicle superstructure, comprising seat frame means including a rigid shell-like member and backrest means, seat cushion means supported upon said seat frame means, the improvement consisting essentially of means for supporting said seat frame means on said vehicle superstructure to enable movement of said seat construction in the longitudinal direction of the vehicle, said last-mentioned means including forward and rear bearing means secured to said shell-like member and forming forward and rear pivotal support axes extending in the transverse direction of the vehicle, said forward bearing means comprising an indentation in the bottom of said shell-like member approximately in the center thereof and adjacent the front edge and having a pair of oppositely disposed apertures in the sides thereof, a tubular housing, a pair of pivot bolt members slidable within said housing and adapted to slide into said apertures, and a compression spring secured between said bolt members for pressing said bolt members into said apertures, and a forward swinging support means for said tubular housing pivotally secured to said superstructure and a rear swinging member arranged adjacent each side of said seat frame means, each said swinging member being pivotally supported upon said vehicle superstructure at the bottom end thereof and pivotally connected at the upper end thereof to the rear bearing means, said rear bearing means comprising a projection on each side of said shell-like member adjacent the rear thereof, said projections being disposed in the region of said backrest means in a plane vertically spaced above said forward bearing means and the lower pivotal supports for said rear swinging members being arranged in a plane vertically spaced above the pivotal supports for said lower swinging members in such a manner that the pivotal points for each side of said seat frame means in side view are arranged substantially at the corners of a parallelogram ascending rearwardly from the front of said seat frame means, and adjustment means operatively connecting said seat frame means and said superstructure, whereby a high stability of the seat construction is attained.

8. A seat construction as defined in claim 7, wherein said forward swinging support means comprises a pair of members connected together to form a generally V-shaped structure, said tubular housing being supported at the upper portion of said V-shaped structure.

References Cited in the file of this patent

UNITED STATES PATENTS

| | | |
|---|---|---|
| 1,247,385 | Fessler | Nov. 20, 1917 |
| 1,609,249 | Hill | Nov. 30, 1926 |
| 1,681,163 | Austin | Aug. 21, 1928 |
| 2,270,172 | Ruegger | Jan. 13, 1942 |
| 2,576,365 | Scott et al. | Nov. 27, 1951 |
| 2,583,349 | Widman et al. | Jan. 22, 1952 |
| 2,600,886 | Korner | June 17, 1952 |
| 2,606,592 | McIntyre | Aug. 12, 1952 |
| 2,825,581 | Knight | Mar. 4, 1958 |
| 2,826,241 | Himka | Mar. 11, 1958 |
| 2,976,916 | Schladermundt et al. | Mar. 28, 1961 |

FOREIGN PATENTS

| | | |
|---|---|---|
| 151,161 | Austria | Oct. 25, 1937 |
| 535,717 | Canada | Jan. 15, 1957 |